United States Patent [19]
Ball

[11] 4,105,860
[45] Aug. 8, 1978

[54] ELECTRICAL CABLE INSTALLATIONS WITH COOLING MEANS

[75] Inventor: Edmund Hugh Ball, Southampton, England

[73] Assignee: Pirelli General Cable Works Ltd., London, England

[21] Appl. No.: 745,370

[22] Filed: Nov. 26, 1976

[30] Foreign Application Priority Data

Dec. 5, 1975 [GB] United Kingdom ............... 50072/75

[51] Int. Cl.² ...................... H02G 9/02; H02G 15/08; H01B 7/34
[52] U.S. Cl. .................................. 174/15 C; 174/37; 174/85
[58] Field of Search ..................... 174/15 C, 85, 15 R, 174/16 R, 16 B, 37

[56] References Cited

U.S. PATENT DOCUMENTS 3,409,731  11/1968  Fink et al. ........................ 174/15 C

FOREIGN PATENT DOCUMENTS 1,196,842  7/1970  United Kingdom ................. 174/15 C
1,209,355  10/1970  United Kingdom ................. 174/15 C
1,375,602  11/1974  United Kingdom ................. 174/15 C

*Primary Examiner*—Laramie E. Askin
*Attorney, Agent, or Firm*—Brisebois & Kruger

[57] ABSTRACT

Potential hot spots, such as at joints, in buried power cable runs are cooled by juxtaposing coolant flow conduits adjacent the cable and providing thermally conductive bridging members between the conduits and the cable throughout the potential hot spots to provide local cooling directly at the hot spots. The bridging members are cast metal clamps with portions to attach to lugs formed on the metallic cable sheath at the hot spots and portions which embrace the cooling conduits. Copper strips are provided underlying the clamps and embracing the cable and the cooling conduits to enhance thermal transfer from the cable to the coolant, and, with the coolant conduits formed of copper pipe, electrical insulators are provided in the metallic cable sheath so as to define an electrically isolated section in the region of the potential hot spot which can be coupled thermally and electrically directly to the coolant conduits.

8 Claims, 5 Drawing Figures

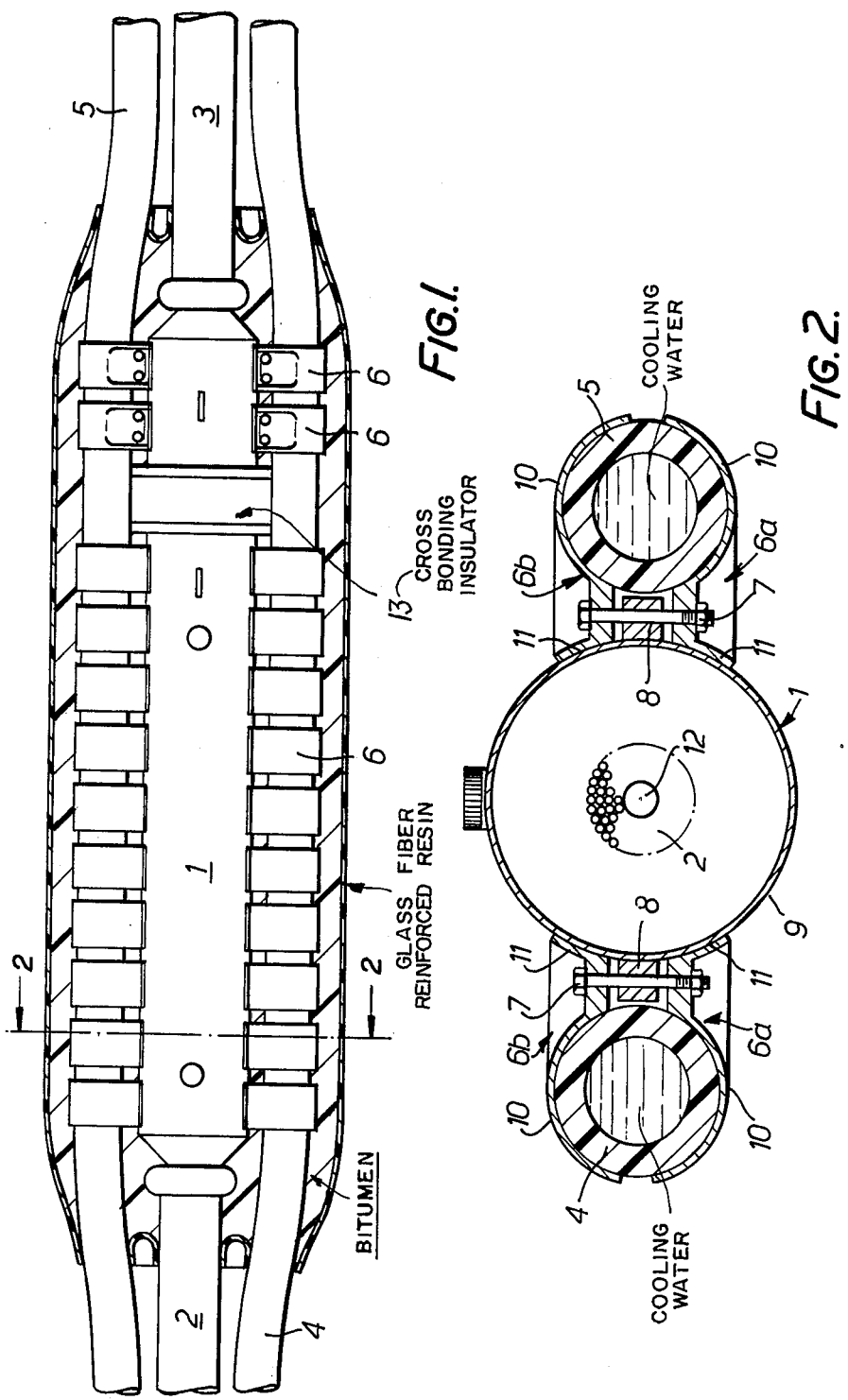

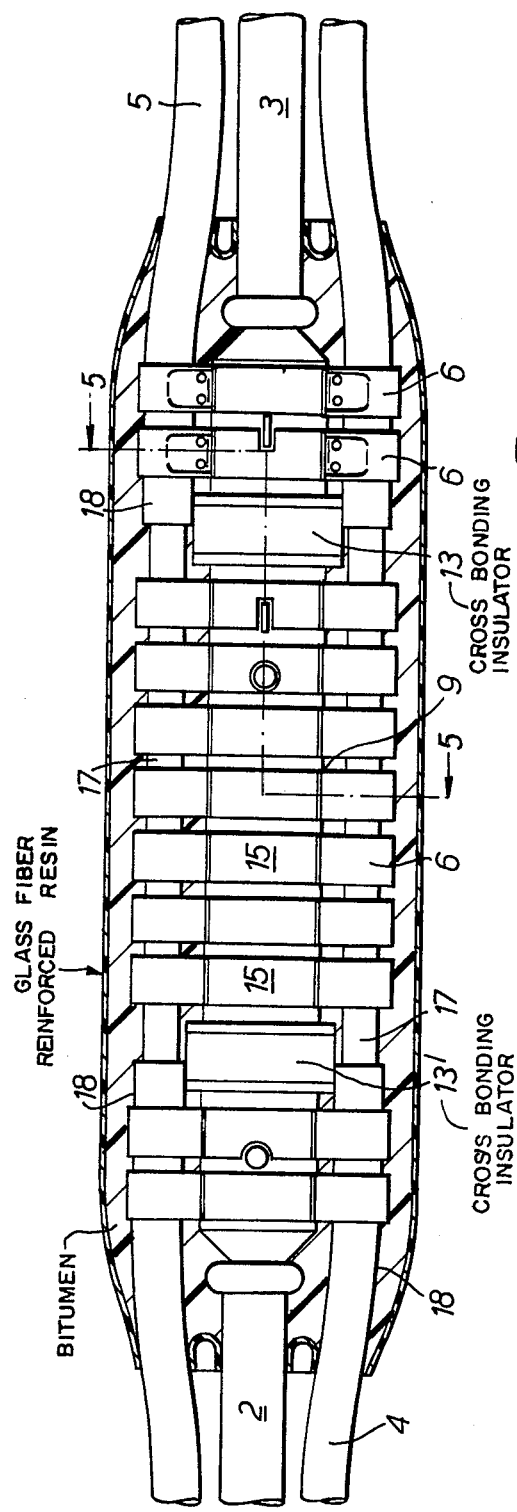
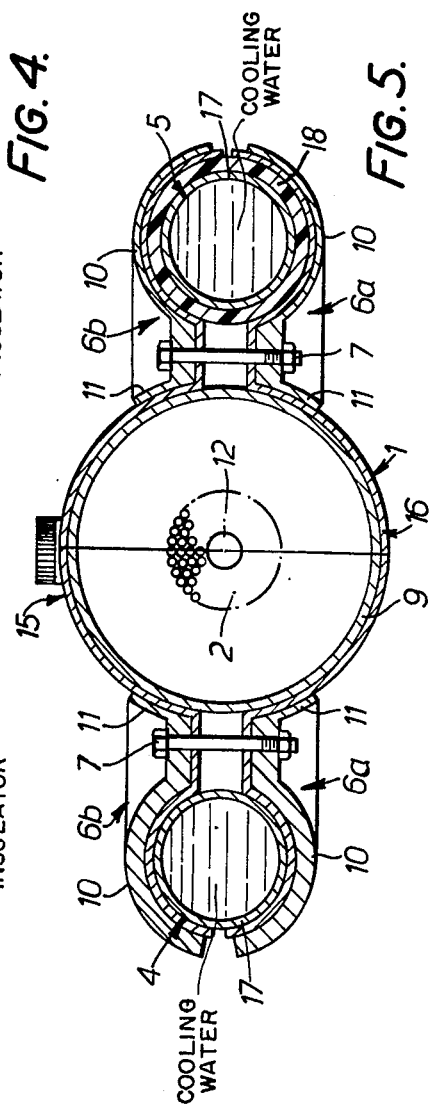

ELECTRICAL CABLE INSTALLATIONS WITH COOLING MEANS

This invention concerns improvements in or relating to electrical cable installations, and more particularly is concerned with the cooling of electrical cables and particularly buried power cables. It is well known that such cables require cooling and it is common practice in cable installations to provide some means of cooling the cables particularly in the region of cable accessories, such as joints for example, where the electrical insulation thickness may be greater, thus leading to potential hot spots in the installation.

According to the present invention, the cooling of an electrical cable run, the cable run including at least one accessory (such as a joint) subject to increased heating as compared with the remainder of the cable run, is effected by laying a conduit proximate the cable throughout the cable run, the conduit serving for the forced passage of coolant to cool the cable run, and providing thermally conductive bridging members between the conduit and the said accessory and maintained in heat transfer relationship therewith for conductive transfer of heat from the accessory to coolant in the conduit.

By this means, it can be arranged that all potential hot spots in a cable run have preferential access for heat transfer to the coolant; that is to say that the hot spots are thermally coupled to the coolant by means having a greater thermal conductivity than the material (commonly aggregate or other in-fill material in the case of a buried cable) between the cable and the conduit throughout the remainder of the cable run.

Two or more coolant conduits may be associated with the same length of cable run depending upon the anticipated degree of heat generation in the cable and the resultant need for cooling capacity, the conduits being arranged around the cable run all juxtaposed with the cable and all being preferentially thermally coupled with anticipated hot spots by provision of bridging members as described above.

According to a preferred arrangement, the conduit, or conduits, are constituted by continuous synthetic plastic material pipes, and the bridging members are constituted by cast metal clamps adapted to secure the conduits in good heat transfer relationship with the cable accessory. In the case of an installation wherein the accessory concerned is a cable joint, for example, the clamps may be adapted for attachment to lugs formed for the purpose on the joint sleeve.

In a modification of the abovementioned preferred arrangement, thermally conductive metal strips are provided, the strips each being shaped to conform to the external surface of the accessory and of the coolant conduits, and being adapted to underlie the clamps in close thermal contact with the surfaces of the accessory and the coolant conduits. The clamps thus serve to hold the strips against the accessory and the coolant conduits, and the strips provide a continuous heat transfer path between the accessory and the coolant conduits. By use of copper strips, which can be made relatively thin, any irregularities in the shapes of the accessory or of the coolant conduits can readily be accommodated.

It is furthermore preferred to form the coolant conduit(s) of metallic (e.g. copper) pipes surrounded by electrically insulating material, such a construction having greater capacity to withstand the forces arising from the clamping of the bridging members to the conduits. In the case where the cable and the accessory are formed with a metallic outer sheath, which is commonly the case with electrical power cables, the use of metallic coolant conduits, at least adjacent the hot spot in the cable run which is to be preferentially cooled, enables a particularly advantageous arrangement to be adopted wherein insulators are provided in the cable or accessory sheath to provide an electrically isolated sheath section which includes the cable hot spot desired to be cooled, and the bridging members (in the form of metallic clamps as aforesaid) are directly coupled between the isolated sheath portion and the flanking metal pipe conduit thereby providing for efficient thermal transfer between the contacting surfaces of the metal sheath, the metal clamps and the metal cooling pipes.

The invention, of course, also extends to electrical cable installations constructed in accordance with the methods described herein and incorporating the features mentioned above.

Further features and advantages of the present invention will become apparent from consideration of the following detailed description of exemplary cable joint installations which are illustrated in the accompanying drawings wherein:

FIG. 1 is a schematic view of the cable joint;

FIG. 2 is a cross-sectional view taken on the line 2—2 of FIG. 1;

FIG. 4 is a schematic view, similar to that of FIG. 1, of a further modified cable joint, and FIG. 5 is a cross-sectional view taken on the stepped line 2—2 of FIG. 4.

Figure 3:
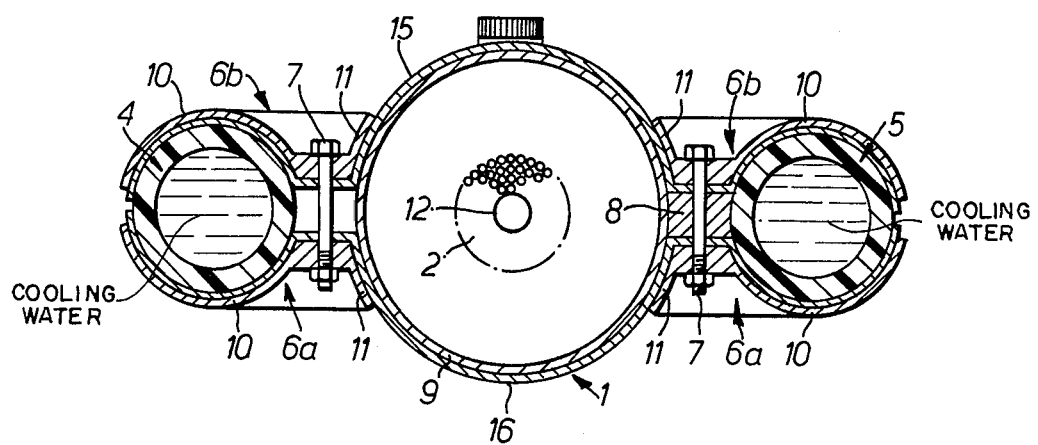
FIG. 3 is a cross-sectional view, similar to that of FIG. 2, showing a modification of the cable joint of FIGS. 1 and 2.

Referring to the drawings, FIG. 1 shows a joint 1 between cable ends 2 and 3, a pair of cooling pipes 4 and 5 extending continuously through the installation proximate the cables 2 and 3 and the joint 1, and a plurality of clamps 6 providing for effective heat transfer between the joint 1 and the cooling pipes 4 and 5. A bitumen-filled protective box (formed of glass fibre reinforced synthetic resin material for example) encases the joint assembly.

FIG. 2 shows the arrangement of FIG. 1 in cross-section. As shown, the clamps 6 are each formed as two opposed parts 6a and 6b adapted to be bolted together by means of bolts 7 passed through apertures formed for the purpose in lugs 8 provided in two sets spaced opposite one another on either side of joint sleeve 9. Each part of each clamp has a first portion 10 shaped to complement the curvature of the cooling pipes 4 and 5, and a second portion 11 shaped to complement the curvature of the joint sleeve 9, the clamps thereby being adapted to seat closely with the cooling pipes and the joint sleeve to provide for efficient heat transfer therebetween.

As will be appreciated by those skilled in this art, the arrangement above described will provide for efficient cooling of the cable joint, heat developed in the joint being transferred conductively through the joint insulation to the metallic joint sleeve 9 and therefrom via the clamps 6 to the cooling pipes 4 and 5. Further cooling of the arrangement may be provided by construction of the cable and the cable joint to include a passage 12 for the flow therethrough of an oil coolant or the like.

To limit the sheath circulating currents which otherwise arise in three phase groups of single-core metal sheathed cables which are bonded and earthed at each end of the cable run, a cross bonding technique is commonly used as is described for example in the textbook "Power Cables — Their Design and Installation" by C. C. Barnes, published by Chapman & Hall Ltd., London, 1966, or in British Patent Specification No. 1,086,312. This technique requires breaks in the sheath metallic continuity at the joints by the provision of annular barriers of insulation material inserted in the joint sleeves and also the provision of electrical insulation between the joint sleeves and earth potential. A cross bonding insulator 13 is illustrated in FIG. 1, as serving this function, the annular insulator 13 serving to bond together the parts of the joint sleeve 9 on either side thereof. As will be appreciated from the foregoing description, the cooling technique herein described does not interfere with this cross bonding technique.

There has thus been described an improved cable cooling technique in accordance with which the cooling conduits (comprised for example of continuous polyethylene pipes) laid adjacent to the cable are coupled to cable accessories for enhanced heat transfer between the accessories and coolant flowing in the pipes. Since the cable joint sleeve is commonly metallic, the use of electrically-insulating material for the coolant conduits is advantageous in that the conduits, and the coolant flowing therethrough, do not interfere with the electrical insulation between the two parts of the cable sleeve on opposite sides of the cross bonding insulator 13, it being appreciated that the coolant in the pipes 4 and 5 will commonly be water which is electrically conductive.

As will be apparent to those skilled in the cable art, variations and modifications of the arrangement above described are possible without departure from the scope of this invention as defined in the appended claims. It is therefore to be clearly understood that the arrangement above described is only an exemplary form of the invention and is in no way to be regarded as limiting the scope of the invention.

For example, a modified arrangement in accordance with the invention is shown in FIG. 3 of the accompanying drawings which is a cross-sectional view similar to that shown in FIG. 2.

Referring to FIG. 3, the arrangement shown therein incorporates a plurality of metallic strips 15 and 16, formed of copper for example and shaped to conform closely to the external shape of the cable joint 1 and its two flanking cooling pipes 4 and 5. The strips 15 and 16 underlie the clamps 6 and closely embrace the joint 1 and the cooling pipes 4 and 5 so as to be in good thermal contact therewith for efficient conduction of heat from the joint 1 to the cooling pipes 4 and 5. The provision of the strips 15 and 16 enables the lugs 8 to be dispensed with if desired, although the retention of the lugs enhances the transfer of heat from the joint 1 to the cooling pipes 4 and 5; in FIG. 3, the right-hand lug 8 is shown as being retained, whilst the left-hand lug has been dispensed with. It is a matter of choice whether one or all of the lugs 8 are retained or dispensed with. In all other respects, the arrangement of FIG. 3 is similar to that of FIGS. 1 and 2.

A further modification could be made to the arrangement of FIG. 3 by forming the cooling pipes 4 and 5, at least in the region of the joint 1, of copper tubing with an external electrically-insulating layer of high density polyethylene for example. Such a modification would be advantageous in that the cooling pipes 4 and 5 would then be capable of more readily withstanding the clamping action of the clamps 6 without deformation. With the arrangement of FIG. 2 or FIG. 3, it might be found if the cooling pipes 4 and 5 were formed simply of high density polyethylene or of a similar material, that the material of the cooling pipes 4 and 5 might tend to creep under the clamps 6; the modification just mentioned would overcome or at least substantially reduce this problem.

FIGS. 4 and 5 show an arrangement similar to that shown in FIGS. 1 and 2, but modified in accordance with the proposals just described and in accordance furthermore with additional proposals which will be described in the following. A principal and not previously mentioned modification as compared with the arrangement of FIGS. 1 and 2 is the provision of a second cross bonding insulator 13' at the opposite end of the cable joint 1 to the previously mentioned cross bonding insulator 13. The provision of the two cross bonding insulators provides a central section of the cable joint screen 9 which is electrically isolated. The clamps 6 which engage with this central section of the cable joint screen 9 can thus be made to clamp directly (with the interpositioning of the copper strips 15 and 16) on to the central copper pipes of cooling pipes 4 and 5 which are formed as copper pipes 17 surrounded with high density polyethylene insulation 18, the polyethylene 18 being cut back for this purpose as shown in FIG. 4. The clamps 6 outside the central section of the pipe joint between the two cross bonding insulators are, as with the arrangement of FIGS. 1 and 2, coupled on to the polyethylene insulation 18 of the cooling pipes 4 and 5. By virtue of this arrangement, a particularly good heat transfer characteristic is obtained between the body of the joint 1 and the cooling pipes 4 and 5. Clearly, the copper pipe 17 need not extend the full length of the cooling pipes 4 and 5, but need extend only throughout the section of the joint 1 between the cross coupling insulators 13 and 13', being connected at its ends to plain polyethylene tubing by means of appropriate connectors.

I claim:

1. An electrical power cable installation including a cable run incorporating at least one accessory (such as a cable joint) subject to increased heating as compared with other parts of the cable run, at least one conduit extending alongside the cable but spaced therefrom throughout the cable run, the conduit serving for the forced passage of coolant to cool the cable run throughout the length thereof by conductive transfer of heat from the cable to coolant in the conduit, and thermally conducting bridging members provided solely between the conduit and the said accessory and maintained in heat transfer relationship therewith for providing preferential access for greater conductive transfer of heat from the accessory to the coolant in the conduit than from other parts of the cable run.

2. An electrical cable installation as claimed in claim 1 wherein said bridging members comprise metallic clamps having portions abutting the accessory in close thermal contact therewith and further portions contacting the conduit in good thermal contact therewith.

3. An electrical cable installation as claimed in claim 2 including strips of thermally conductive material formed closely to conform to the external surfaces of said accessory and said at least one conduit, said bridging members clamping said thermally conductive strips in good thermal contact with the accessory and with the conduit.

4. An electrical cable installation as claimed in claim 3 wherein said cable and cable accessory are formed with an external metallic sheath, electrical insulators are provided in said sheath so as to define an electrically isolated portion thereof in the region of said accessory, each of said at least one cooling conduits comprises a metal pipe in the region thereof juxtaposed with said isolated sheath portion, and said bridging members make direct thermal and electrical contact between said isolated sheath portion and said metal pipe.

5. An electrical power cable installation comprising a buried cable run incorporating at least one cable joint subject to increased heating in use of the cable as compared to other parts of the cable run, at least one coolant conduit buried adjacent the cable and extending alongside the cable throughout the cable run with spacing from the cable, said at least one conduit serving for the forced passage of coolant to cool the cable run throughout its length by conductive transfer of heat from the cable to coolant in the conduit, and a plurality of thermally conductive bridging members provided only at each joint location for coupling each joint location with at least one coolant conduit for providing preferential access to the coolant for heat developed in the cable at each joint, said bridging members each comprising a two part metallic clamp each part whereof has a portion shaped for abutment with the exterior surface of a cable joint and a portion shaped for partially embracing a coolant conduit in close thermal contact therewith, the two parts of each clamp being assembled in opposed relationship with each other so that each clamp substantially embraces a coolant conduit and abuts the juxtaposed cable joint in close thermal contact in each case with the conduit and with the joint.

6. An electrical power cable installation according to claim 5 further comprising strips of thermally conductive material, conformant to the external surfaces of the conduit and the joint, extending between the conduit and the joint, and interposed between each clamp part and the respective conduit and joint.

7. An electrical power cable installation according to claim 5 wherein the cable and at least one cable joint are formed with an external metallic sheath, electrical insulators are provided in the sheath of at least one joint to define an electrically isolated portion thereof, the said at least one coolant conduit comprises a metal pipe in the region thereof juxtaposed with said isolated sheath portion, and said bridging members make direct thermal and electrical contact between said isolated sheath portion and said metal pipe.

8. An electrical power cable installation according to claim 7 wherein at least one coolant conduit comprises metal tubing with an external electrically-insulating layer of plastic material, and, in the region thereof juxtaposed with the isolated sheath portion, the layer of plastic material is cut away to expose the metal tubing to contact with the bridging members.

* * * * *